(12) United States Patent
Takashiro et al.

(10) Patent No.: US 8,389,146 B2
(45) Date of Patent: Mar. 5, 2013

(54) TERMINAL UNIT AND METHOD OF MANUFACTURING THE SAME

(75) Inventors: Shigeru Takashiro, Toyota (JP); Hiroyasu Kado, Toyota (JP); Shigeki Ishii, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 234 days.

(21) Appl. No.: 12/574,174

(22) Filed: Oct. 6, 2009

(65) Prior Publication Data

US 2010/0092858 A1    Apr. 15, 2010

(30) Foreign Application Priority Data

Oct. 14, 2008    (JP) .................................. 2008-265666

(51) Int. Cl.
*H01M 2/30* (2006.01)
(52) U.S. Cl. ........ 429/121; 429/178; 429/170; 429/182; 429/183
(58) Field of Classification Search .................. 429/121, 429/170, 178, 182, 183
See application file for complete search history.

(56) References Cited

FOREIGN PATENT DOCUMENTS

| JP | 08-306347 | 11/1996 |
|----|-----------|---------|
| JP | 2005-285406 | 10/2005 |

*Primary Examiner* — Jane Rhee
(74) *Attorney, Agent, or Firm* — Finnegan, Henderson, Farabow, Garrett & Dunner, LLP

(57) ABSTRACT

The first aspect of the present invention is a terminal unit which contains an electrode part disposed in a case, for connecting with an electrode body and a terminal part having a rod shape with a first end and a second end, the first end for fixing to the electrode part, and the second end extending outside of the case. In one embodiment of the first aspect of the invention, the electrode part includes an insert hole into which the terminal part is inserted, the terminal part comprises an insert portion having an insert portion having a larger diameter than that of the hole and formed at the first end and a tip portion having a smaller diameter than that of the hole and formed at the nearer side of the first end than the insert portion. And, the clinch portion is press fitted into the insert hole, thereby fixing the terminal part to the electrode part. According to the present invention, the varying of electric conductivity in the terminal unit is prevented.

4 Claims, 8 Drawing Sheets

(a)

(b)

TERMINAL UNIT AND METHOD OF MANUFACTURING THE SAME

BACKGROUND OF THE INVENTION

1. Field of the Invention

The present invention relates to a terminal unit and a method of manufacturing the terminal unit.

2. Description of Related Art

Conventionally, to press fit terminal parts of rod shape into holes formed on electrode parts such as current collection plates, or to crimp terminal parts after inserting the terminal parts into holes of electrode parts provides terminal units with fixing structure of the terminal parts to the electrode parts, and batteries equipped with the terminal units having the fixing structures are well known (e.g. see JP 2005-285406 A).

JP 2005-285406 A discloses a conventional terminal unit, in which the metal oxide films formed on each surface of the parts surrounds the contacting area of the terminal part to the electrode part. Unfortunately, the unevenness of the electrical conductivity occurs depending on the condition of press fitting or crimping. Therefore, the batteries including conventional terminal units mentioned above tend to vary in quality.

BRIEF SUMMARY OF THE INVENTION

The present invention relates to a technique of a terminal unit having a press fitting structure of a terminal part into an electrode part and aims to provide a terminal unit capable of preventing a vary in electrical conductivity thereof by means of fixing the terminal part to the electrode part with removing the oxide films formed on the parts.

The first aspect of the present invention is a terminal unit which contains an electrode part disposed in a case, for connecting with an electrode body and a terminal part having a rod shape with a first end and a second end, the first end for fixing to the electrode part, and the second end extending outside of the case.

In one embodiment of the first aspect of the invention, the electrode part includes an insert hole into which the terminal part is inserted, the terminal part comprises an insert portion having an insert portion having a larger diameter than that of the hole and formed at the first end and a tip portion having a smaller diameter than that of the hole and formed at the nearer side of the first end than the insert portion. And, the clinch portion is press fitted into the insert hole, thereby fixing the terminal part to the electrode part.

Accordingly, when press fitting the terminal part into the electrode part, the insert portion having larger diameter than the insert hole pares off the oxide films formed on the electrode part.

Therefore, the electric conductivity between the terminal part and the electrode part is secured, thereby preventing varying in quality of the electric products with the terminal unit.

In the preferable embodiment of the terminal unit, the terminal part is made of harder substance than the electrode part.

Accordingly, the insert portion of the terminal part removes the oxide film on the electrode part.

In the advantageous embodiment of the terminal unit, the insert portion has an uneven surface having projections and recesses at a periphery thereof and the tip portion has a tapered portion being tapered from the first end toward the second end.

Accordingly, the uneven surface of the insert portion enlarges the contacting area between the terminal part and the electrode part, thereby enhancing the electric conductivity thereof. Furthermore, the neck portion of the tapered portion receives the materials pared off by the uneven surface in press fitting. As a result, the generation of the chips in press fitting is prevented.

The second aspect of the present invention is a method of manufacturing a terminal unit which contains an electrode part disposed in a case, for connecting with an electrode body and a terminal part having a rod shape with a first end and a second end, the first end for fixing to the electrode part, and the second end extending outside of the case.

In one embodiment of the second aspect of the invention, it includes a step of providing an insert hole for inserting the terminal part with the electrode part and of providing a clinch portion with the terminal part comprising an insert portion having a larger diameter than that of the hole and formed at the first end; and a tip portion having a smaller diameter than that of the hole and formed at the nearer side of the first end than the insert portion. It also includes a step of press fitting the clinch portion into the insert hole for fixing the terminal part to the electrode part.

Accordingly, when press fitting the terminal part into the electrode part, the insert portion having larger diameter than the insert hole pares off the oxide films formed on the electrode part.

Therefore, the electric conductivity between the terminal part and the electrode part is secured, thereby preventing varying in quality of the electric products with the terminal unit.

In the preferable embodiment of the manufacturing method, the terminal part is made of harder substance than the electrode part.

Accordingly, the insert portion of the terminal part removes the oxide film on the electrode part.

In the advantageous embodiment of the manufacturing method, it further includes a step of providing the insert portion with an uneven surface having projections and recesses at a periphery thereof and of providing the tip portion with a tapered portion being tapered from the first end toward the second end.

Accordingly, the uneven surface of the insert portion enlarges the contacting area between the terminal part and the electrode part, thereby enhancing the electric conductivity thereof. Furthermore, the neck portion of the tapered portion receives the materials pared off by the uneven surface in press fitting. As a result, the generation of the chips in press fitting is prevented.

According to the present invention, the varying of electric conductivity in the terminal unit is prevented.

DETAILED DESCRIPTION OF THE INVENTION

Referring FIG. 1, the whole structure of a battery 1 will be described, which includes terminal units 4, 9, each of which is one embodiment of a terminal unit according to the present invention.

It should be noted that the battery 1 including the terminal units 4, 9 is described in this description, though the terminal unit according to the present invention may be broadly applied, not limited to the battery.

Figure 1:
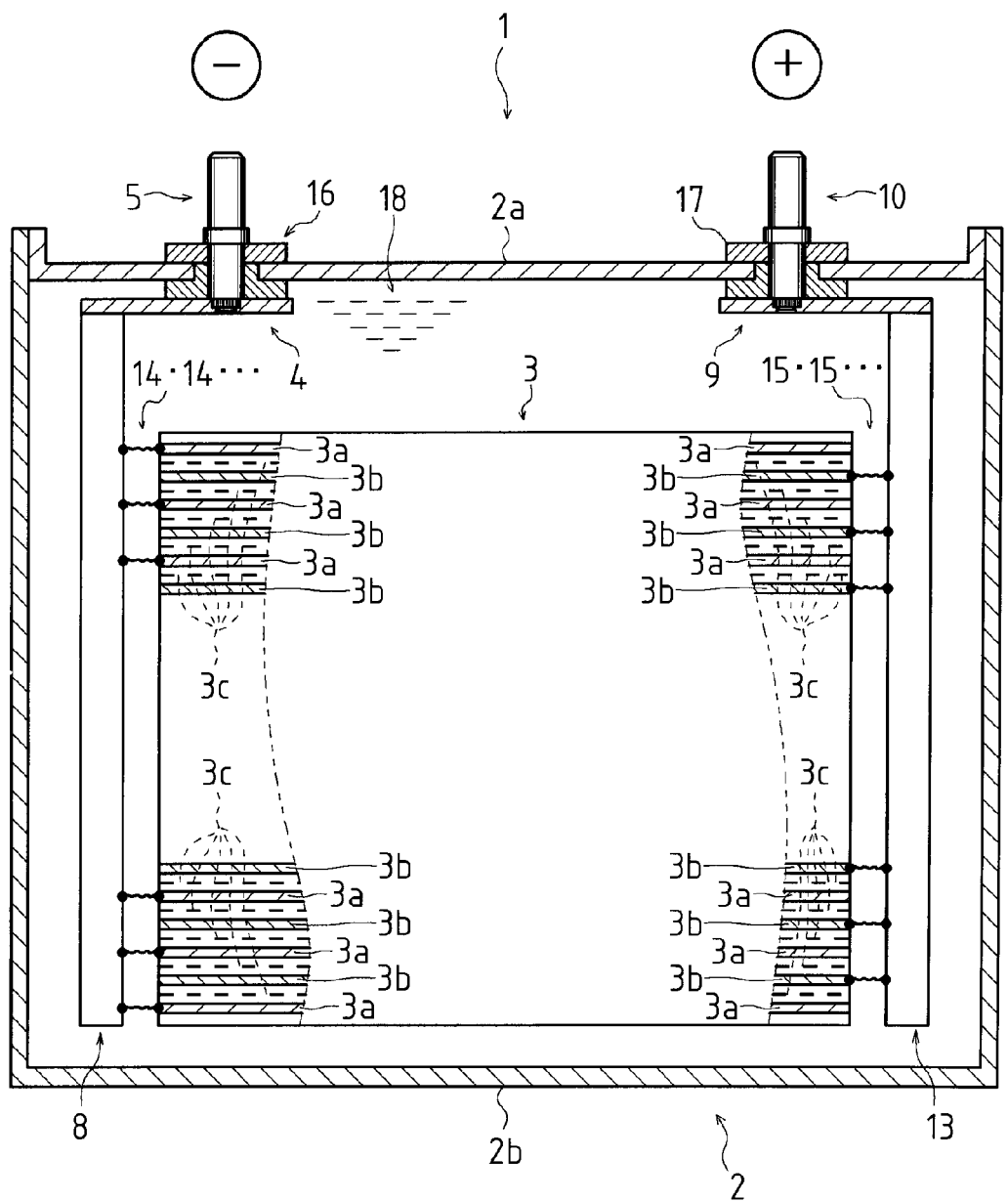
FIG. 1 is a sectional view of a battery containing terminal units according to the present invention.

As shown in FIG. 1, the battery 1 is a box-shaped lithium-ion battery, containing a case 2, an electrode body 3, and the terminal units 4, 9.

The case 2 is composed of a lid part 2a and a case part 2b, and is filled with an electrolyte solution 18 that behave as an electrically conductive medium.

The electrode body 3 is, for example, composed of a negative electrode sheet 3a such as a copper sheet coated with a carbon substance, a positive electrode sheet 3b such as a aluminum sheet coated with a lithium-ion compound and a separator sheet 3c, and the sheets 3a, 3b are winded through the sheet 3c, thereby forming the electrode body. The sheets 3a, 3b are connected to plural wires 14, 15, respectively, as electrical paths. The wires 14, 15 are connected to the terminal units 4, 9, respectively.

The terminal unit 4 contains an electrode part 8 and a terminal part 5, and serves as a negative terminal composed of copper (hereinafter, called a negative terminal unit). The terminal unit 9 contains an electrode part 13 and a terminal part 10, and serves as a positive terminal composed of aluminum (hereinafter, called a positive terminal unit).

The electrode parts 8, 13 are disposed in the case 2 and connected with the wires 14, 15. The terminal parts 5, 10 have a rod shape and the one ends is fixed to the electrode parts 8, 13 and the other ends extend outside of the case 2.

That is, the first ends 5a, 10a of the terminal parts 5, 10 are fixed to the electrode parts 8, 13, which integrates them, and thus the terminal units 4, 9 are formed.

Figure 2:
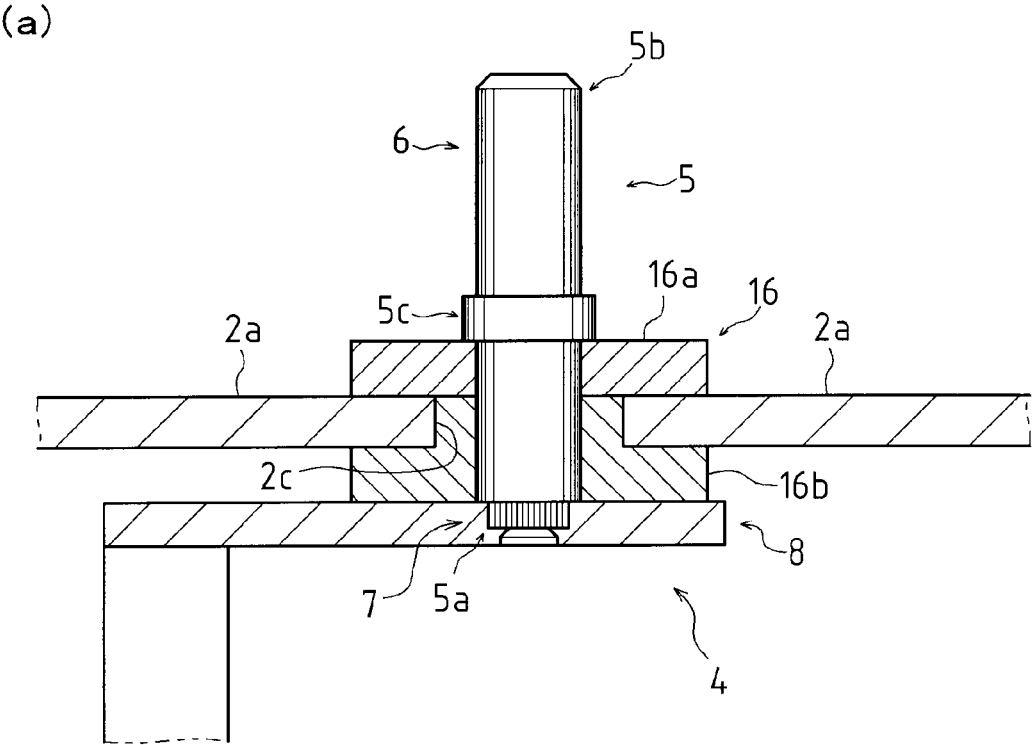
FIG. 2 is a schematic view of the terminal units assembled into the battery, (a) showing the negative side and (b) showing the positive side.
Figure 2:
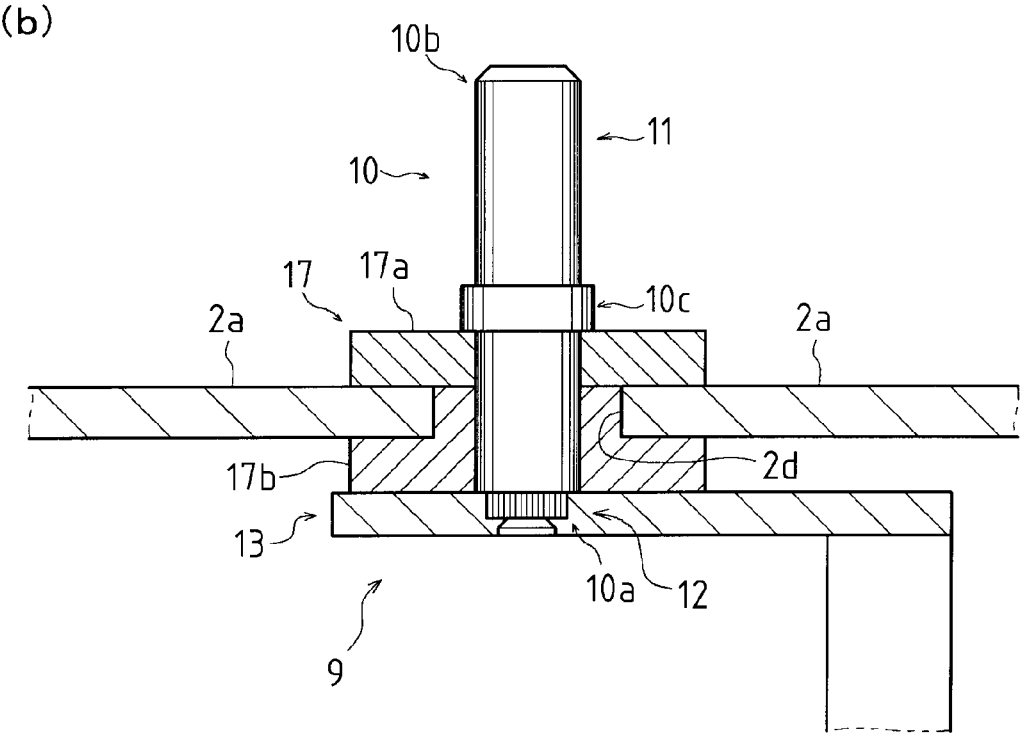

With reference to FIGS. 1 and 2, the fixing structure of the terminal units 4, 9 to the lid part 2a will be described.

As shown in FIGS. 1 and 2, the second ends 5b, 10b of the terminal parts 5, 10 goes through the holes 2c, 2d formed at the lid part 2a, thereby the second ends extending outside of the case 2.

The negative terminal unit 4 is connected to the negative electrode sheet 3a via the wires 14, the positive terminal unit 9 is connected to the positive electrode sheet 3b via the wires 15. Thus, the terminal units 4, 9 provide the electric paths among inside and outside of the case 2.

The holes 2c, 2d are covered with seal parts 16, 17. In other words, the seal parts 16, 17 are arranged between the terminal parts 5, 10 and the holes 2c, 2d, and the terminal parts 5, 10 are arranged, thereby insulating between the lid part 2a and the terminal part 5, 10. At the same time, the seal parts 16, 17 seal between the holes 2c, 2d and the terminal parts 5, 10 and between the lid parts 2a and the terminal parts 5, 10, thus, preventing leakage of the electrolyte solution 18.

As shown in FIG. 2, the seal parts 16, 17 have outer parts 16a, 17a and inner parts 16b, 17b, thereby providing separate structures, which makes it easy to attach the seal parts 16, 17 to the holes 2c, 2d.

Referring FIGS. 3 to 6, the structures of the terminal units 4. 9 will be followed.

Here, the structure of the positive terminal unit 9 is the same as that of the terminal unit 4, so the structure of the negative terminal unit 4 is shown in FIGS. 3 to 6, and the references of the positive terminal unit 9 are tagged to the corresponding members of the negative terminal unit 4.

As mentioned above, the terminal units 4, 9 contain the terminal parts 5, 10 and electrode parts 8, 13, respectively.

Figure 3:
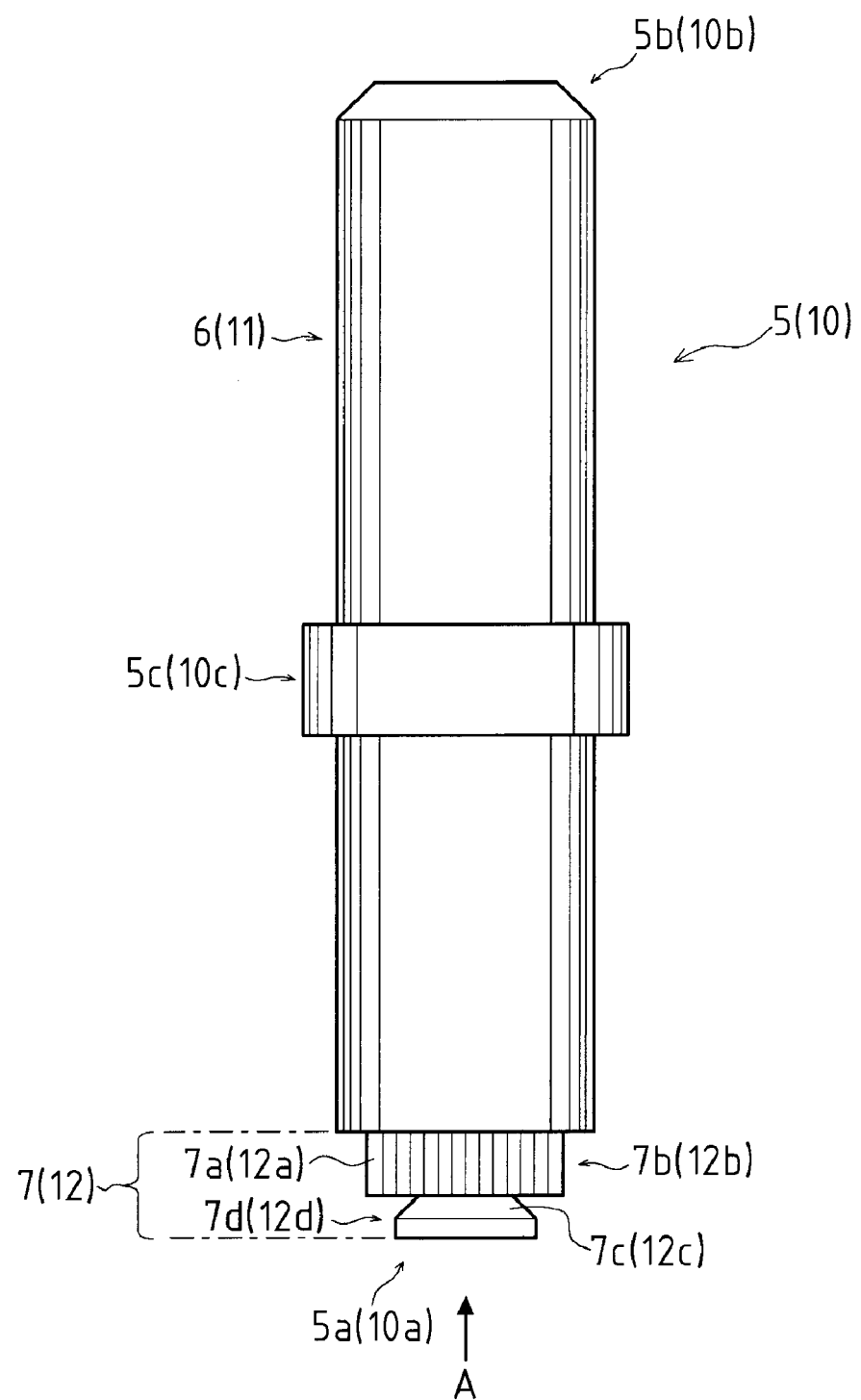
FIG. 3 is a schematic view of a terminal part.

As shown in FIG. 3, the terminal part 5 of the negative terminal unit 4 is a cylindrical metal member and has a clinch portion 7, at the first end 5a, for fixing the terminal part 5 to the electrode part 8.

The clinch portion 7 includes: an insert portion 7b having a cylinder shape and formed with an uneven surface 7a at the periphery of the insert portion; and a tip portion 7d arranged at the nearer side of the first end than the insert portion 7b and formed with a tapered portion 7c that is tapered toward the insert portion 7b (tapered from the first end 5a toward the second end 5b).

The second end 5b of the terminal part 5 has a connecting portion 6 used for constructing an assembled battery containing the batteries 1 or for connecting with the electrical devices disposed outside of the battery 1. For example, the connecting portion 6 has a male thread and fitted to the bus bars via the nuts. So, the assembled battery is constructed by assembling the batteries 1.

The terminal part 5 has a large diameter portion 5c in the middle, which provides a stepped structure, thereby sealing between the terminal part 5 and the seal part 16.

As shown in FIG. 3, the terminal part 10 of the negative terminal unit 9 is a cylindrical metal member and has a clinch portion 12, at the first end 10a, for fixing the terminal part 10 to the electrode part 13.

The clinch portion 12 includes: an insert portion 12b having a cylinder shape and formed with an uneven surface 12a at the periphery of the insert portion; and a tip portion 12d arranged at the nearer side of the first end than the insert portion 12b and formed with a tapered portion 12c that is tapered toward the insert portion 12b (tapered from the first end 10a toward the second end 10b).

The second end 10b of the terminal part 10 has a connecting portion 11 used for constructing an assembled battery containing the batteries 1 or for connecting with the electrical devices disposed outside of the battery 1. For example, the connecting portion 11 has a male thread and fitted to the bus bars via the nuts. So, the assembled battery is constructed by assembling the batteries 1.

The terminal part 10 has a large diameter portion 10c in the middle, which provides a stepped structure, thereby sealing between the terminal part 10 and the seal part 17.

In this embodiment, the terminal part 5 of the negative terminal unit 4 is made of copper-chromium alloys (CuCr), and the terminal part 10 of the positive terminal unit 9 is made of aluminum (A6061-T6).

In this case, the terminal units 4, 9 are constructed by two parts (the terminal parts 5, and the electrode parts 8, 13). Thus, in comparison with the alternative embodiment of the terminal units which are constructed as a one-piece containing a terminal portion and electrode portion, the terminal units as this embodiment composed of two-piece have advantages in terms of facilities and costs for manufacturing.

Figure 4:
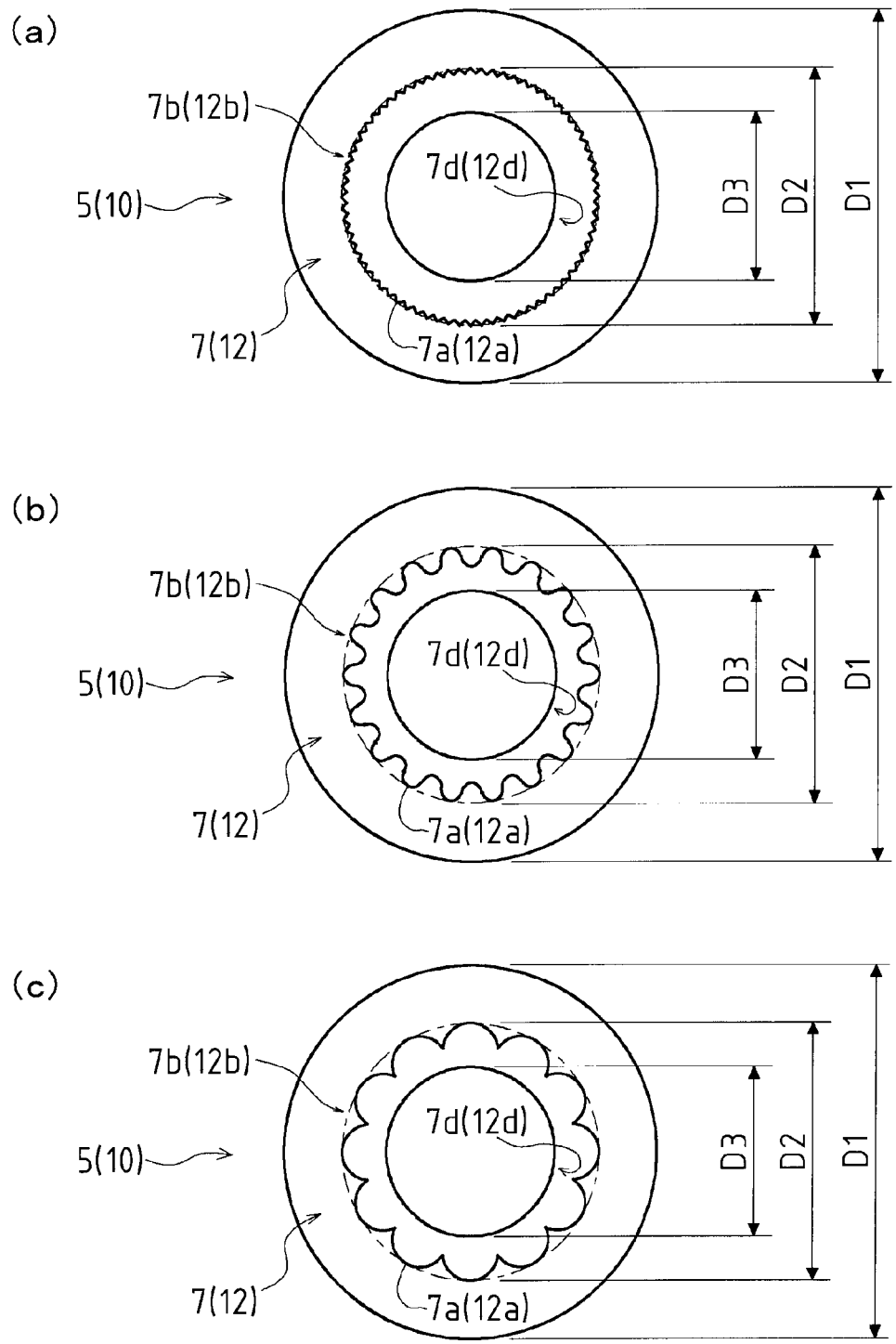
FIG. 4 is a schematic view of an insert portion of the terminal part viewed from the arrow A in FIG. 3, (a) showing a knurling configuration, (b) showing a tooth forming configuration and (c) showing a petaloid forming configuration.

The periphery of the insert portions 7b, 12b of the terminal parts 5, 10 are rough surfaces such as projections and recesses. As shown in FIG. 4, the portions 7b, 12b, viewed from arrow A represented in FIG. 3, are configured in parallel knurl shape (shown in FIG. 4 (a)), in tooth form (shown in FIG. 4 (b)), or in petaloid shape (shown in FIG. 4 (c)).

In these embodiments shown in FIG. 4, the diameters D3 of the tip portions 7d, 12d are smaller than the diameters D2 of the insert portions 7b, 12b, and the diameters D2 are smaller than the diameters D1 of the terminal parts 5, 10.

Figure 5:
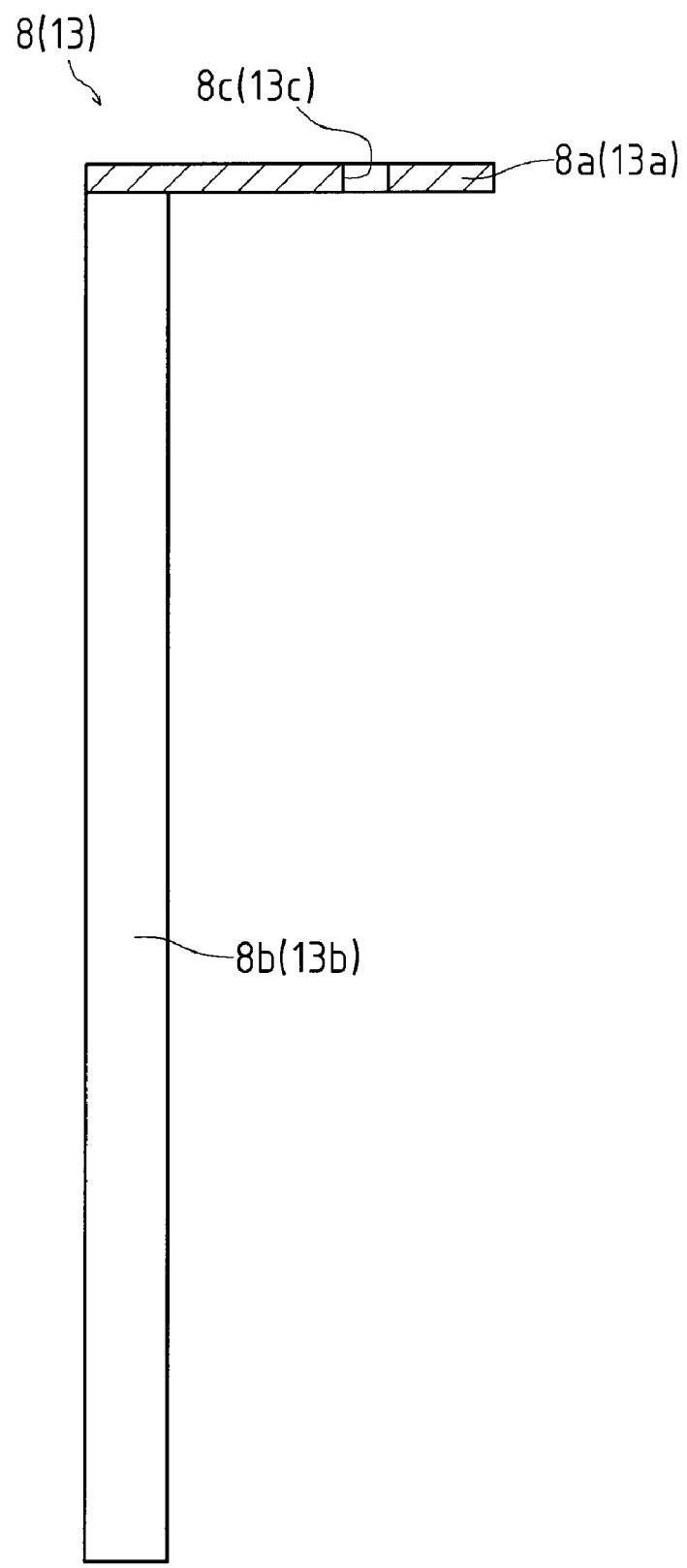
FIG. 5 is a sectional view of an electrode part.

As shown in FIG. 5, the electrode part 8 of the negative terminal unit 4 is a metal member manufactured by bending a plate, and the electrode part has a fixing portion 8a for fixing the terminal part 5 and an electrode portion 8b for collecting the wires 14 and for connecting to the electrode body 3. The fixing portion 8a has an insert hole 8c at the position where the terminal part 5 is fixed.

As shown in FIG. 5, the electrode part 13 of the negative terminal unit 9 is a metal member manufactured by bending a plate, and the electrode part has a fixing portion 13a for fixing the terminal part 10 and an electrode portion 13b for collecting the wires 15 and for connecting to the electrode body 3. The fixing portion 13a has an insert hole 13c at the position where the terminal part 10 is fixed.

In this embodiment, the electrode part 8 of the negative terminal unit 4 is made of pure copper (C1100), and the electrode part 13 of the positive terminal unit 9 is made of pure aluminum (A1050).

Figure 6:
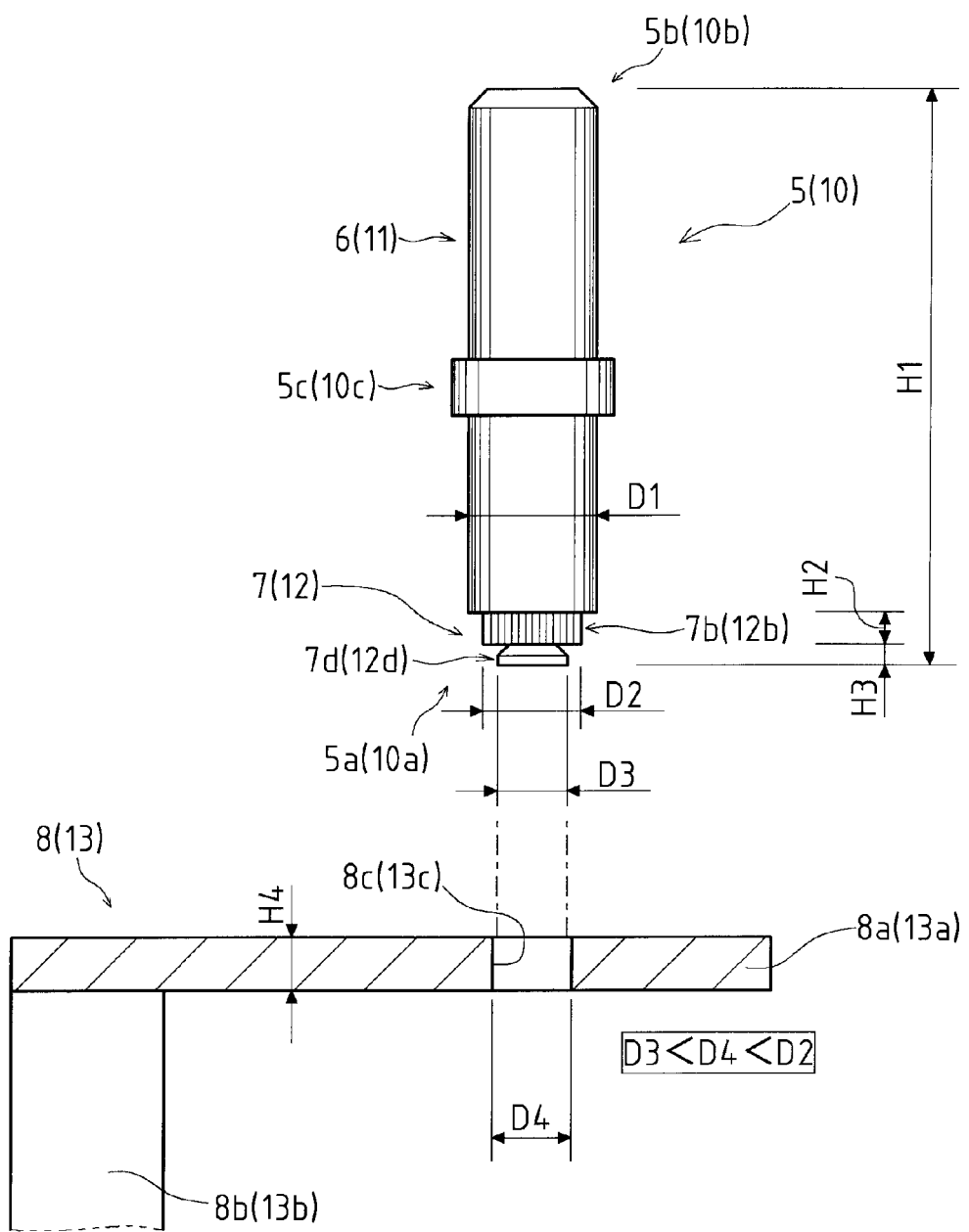
FIG. 6 is an enlarged sectional view showing a relationship between the terminal part and the electrode part in assembling.

As shown in FIG. 6, the diameters D4 of the holes 8c, 13c are larger than the diameters D3 of the tip portions 7d, 12d, so that the tip portions 7d, 12d are smoothly inserted into the holes 8c, 13c. The diameters D4 are smaller than the diameters D2 of the insert portions 7b, 12b.

The dimensions of the terminal parts 5, 10 shown in FIG. 6 are followed: the diameters D1 of the terminal parts 5, 10 are about 6 mm; the heights H1 are about 20 mm; the diameters D2 of the insert portions 7b, 12b are about 5 mm; the heights H2 are about 1 mm; the diameters D3 of the tip portions 7d, 12d are about 4.5 mm; and the heights H3 are about 0.5 mm. The dimensions of the electrode parts 8, 13 are followed: the diameters D4 of the holes 8c, 13c are about 4.6 mm; and the thickness H4 of the fixing portions 8a, 13a are about 1.5 mm.

With respect to the uneven surfaces 7a, 12a of the clinch portions 7, 12 formed in the terminal parts 5, 10, the uneven surfaces have parallel projections to the press fitting direction of the terminal parts 5, 10 (in this embodiment, the axis direction of the terminal parts 5, 10 of cylindrical shape), and when press fitting of the clinch portions 7, 12 into the insert holes 8c, 13c, the projections pare off the inner surface of the holes 8c, 13c. If these actions are satisfied, the configuration of the uneven surfaces 7a, 12a are not limited to the embodiments shown in FIG. 4.

Referring FIGS. 7, 8, the manufacturing method of the terminal units 4, 9 will be described.

Figure 7:
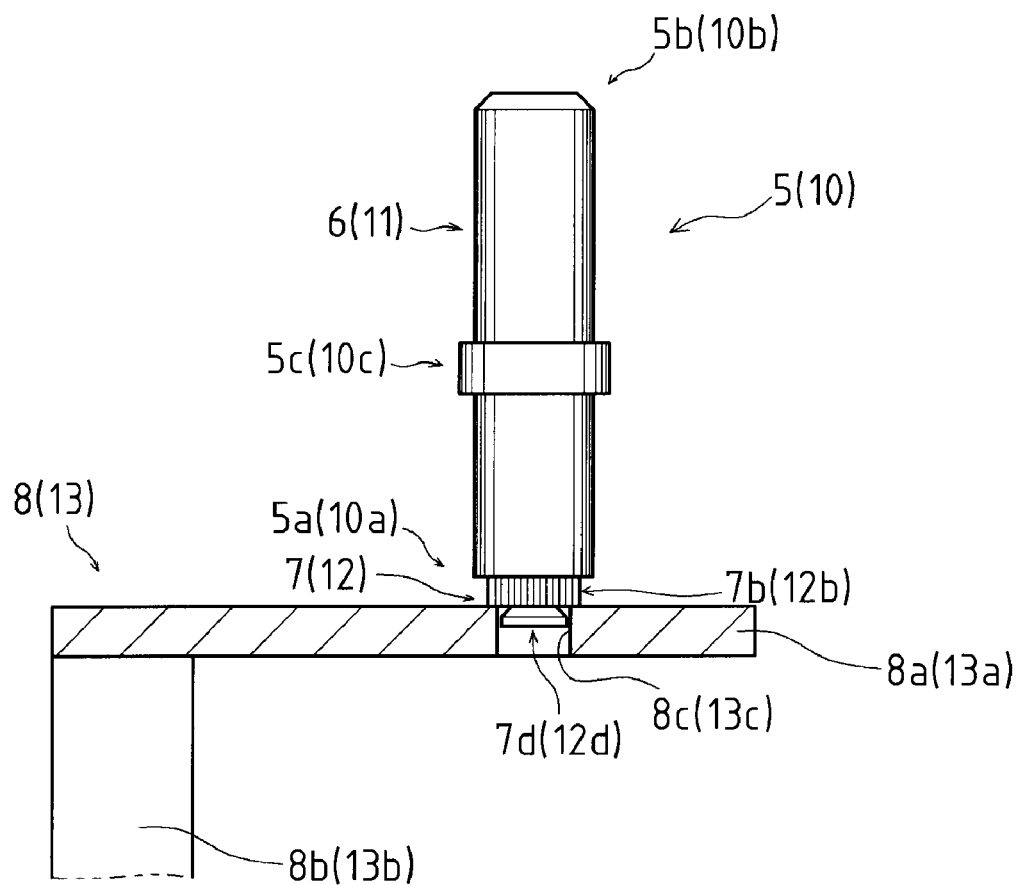
FIG. 7 is an enlarged sectional view showing a manufacturing method of the terminal unit, showing before assembling.
Figure 8:
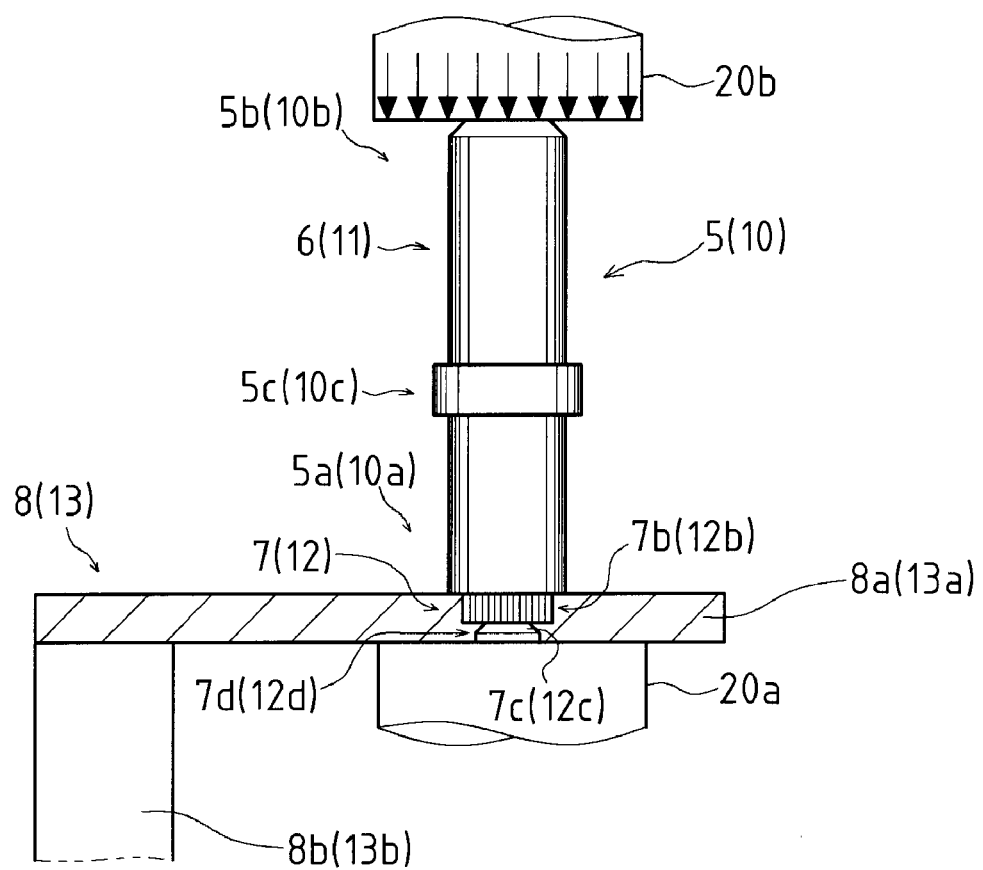
FIG. 8 is an enlarged sectional view showing the manufacturing method of the terminal unit, showing after assembling.

Here, the manufacturing method (assembling procedure) of the positive terminal unit 9 is the same as that of the terminal unit 4, so the assembling procedure of the negative terminal unit 4 is shown in FIGS. 7, 8, and the references of the positive terminal unit 9 are tagged to the corresponding members of the negative terminal unit 4.

As shown in FIG. 7, when assembling the negative terminal unit 4, the tip portion 7d is inserted into the insert hole 8c, thereby positioning the terminal part 5 with regard to the electrode part 8.

As shown in FIG. 8, the lower face of the fixing portion 8a is pressed by a lower die 20a of the press apparatus, and the second end 5b of the terminal part 5 is pressed downwardly by an upper die (punch) 20b of the press apparatus, then the clinch portion 7 (insert portion 7b) is press fitted into the insert hole 8c. Thus, the terminal part 5 and the electrode part 8 are integrated, whereby manufacturing the negative terminal unit 4. In this case, the pressure of the press apparatus is about 20 MPa.

When assembling the positive terminal unit 9, the tip portion 12d is inserted into the insert hole 13c, thereby positioning the terminal part 10 with regard to the electrode part 13.

The lower face of the fixing portion 13a is pressed by the lower die 20a of the press apparatus, and the second end 10b of the terminal part 10 is pressed downwardly by the upper die (punch) 20b of the press apparatus, then the clinch portion 12 (insert portion 12b) is press fitted into the insert hole 13c. Thus, the terminal part 10 and the electrode part 13 are integrated, whereby manufacturing the positive terminal unit 9.

The relationship of hardness between the terminal part 5 and the electrode part 8 is followed: the Vickers hardness of the copper-chromium alloys (CuCr) is about 140 HV; that of the pure copper (C1100) is about 80 HV, thus, the terminal part 5 is made of harder substance than the electrode part 8. Accordingly, when press fitting the clinch portion 7 into the insert hole 8c, the insert portion 7b (in detail, the projections formed on the uneven surface 7a of the insert portion 7b) pares off the inner surface of the insert hole 8c.

At the same time of paring off the inner surface of the insert hole 8c, the oxide film is removed from the inner surface of the insert hole 8c, thereby securing the electrical conductivity between the terminal part 5 and the electrode part 8.

Due to the uneven surface 7a, the surface area of the insert portion 7b becomes larger than the case without the uneven surface 7a. Thus, the contact area between the insert hole 8c and the insert portion 7b becomes larger, thereby enhancing the electrical conductivity between the terminal part 5 and the electrode part 8.

Further, the neck portion formed at the tip portion 7d (the small diameter portion of the tapered portion 7c) receives the materials (pure copper) pared off around the insert hole 8c.

If the materials pared off at press fitting drop into the case 2, they will cause a short circuit of the battery 1 and thus lower the quality thereof. However, due to the configuration of the negative terminal unit 4, the pared off materials (pure copper) will be received into the neck portion of the tapered portion 7c, and they will be forced into the space between the small diameter portion of the tapered potion 7c and the insert hole 8c. Accordingly, the fixing force is heightened between the terminal part 5 and the electrode part 8.

As mentioned above, the chips generated in press fitting are enclosed in the clinch portion 7, preventing drop into the case 2. That is to say, regarding the negative terminal unit 4 configured like that, the chips would not disperse from the insert hole 8c when assembling, so that the terminal unit with the configuration is suitable not only for the battery 1 but also for other battery (e.g. a fuel battery) and electrical components such as a capacitor.

It should be noticed that the copper-chromium alloys (CuCr) and the pure copper (C1100) are employed as the substances of the terminal part 5 and the electrode part 8, respectively, of the negative terminal unit 4, which does not limit the substances employed for the negative terminal unit according to the present invention, and the various combination may be employed where the terminal part is harder than the electrode part.

With respect to the positive terminal unit 9, the relationship of hardness between the terminal part 10 and the electrode part 13, which is as the same as that of the negative terminal unit 4, is followed: the Vickers hardness of the aluminum (A6061-T6) is about 105 HV; that of the pure aluminum (A1050) is about 30 HV, thus, the terminal part 10 is made of harder substance than the electrode part 13.

As described before, the configuration of the positive terminal unit 9 provides the same action as the negative terminal unit 4.

It should be noticed that the aluminum (A6061-T6) and the pure aluminum (A1050) are employed as the substances of the terminal part 10 and the electrode part 13, respectively, of the positive terminal unit 9, which does not limit the substances employed for the positive terminal unit according to the present invention, and the various combination may be employed where the terminal part is harder than the electrode part.

What is claimed is:

1. A terminal unit comprising:
    an electrode part disposed in a case, for connecting with an electrode body; and
    a terminal part having a rod shape with a first end and a second end, the first end for fixing to the electrode part, and the second end extending outside of the case,
    wherein the electrode part comprises an insert hole for inserting the terminal part, and
    wherein the terminal part comprises a clinch portion comprising:
        an insert portion having a larger diameter than that of the hole and formed at the first end; and
        a tip portion having a smaller diameter than that of the hole and formed at a nearer side of the first end than the insert portion,
    wherein the clinch portion is press fitted into the insert hole, thereby fixing the terminal part to the electrode part,
    wherein the insert portion has an uneven surface having projections and recesses at a periphery thereof, and
    wherein the tip portion has a tapered portion being tapered from the first end toward the second end.

2. The terminal unit according to claim 1,
    wherein the terminal part is made of a harder substance than the electrode part.

3. A method of manufacturing a terminal unit comprising an electrode part disposed in a case, for connecting with an electrode body; and a terminal part having a rod shape with a first end and a second end, the first end foxing to the electrode part, and the second end extending outside of the case, the method comprising:
    providing an insert hole for inserting the terminal part with the electrode part;
    providing a clinch portion with the terminal part comprising an insert portion having a larger diameter than that of the hole and formed at the first end; and a tip portion having a smaller diameter than that of the hole and formed at a nearer side of the first end than the insert portion;
    press fitting the clinch portion into the insert hole for fixing the terminal part to the electrode part;
    providing the insert portion with an uneven surface having projections and recesses at a periphery thereof; and
    providing the tip portion with a tapered portion being tapered from the first end toward the second end.

4. The method according to claim 3,
    wherein the terminal part is made of a harder substance than the electrode part.

* * * * *